United States Patent [19]

Colloton

[11] 3,898,891

[45] Aug. 12, 1975

[54] FOOT AND HAND CONTROL FOR HYDROSTATIC TRANSMISSION

[75] Inventor: Marcus J. Colloton, Marshalltown, Iowa

[73] Assignee: Allis-Chalmers Corporation, Milwaukee, Wis.

[22] Filed: Oct. 31, 1974

[21] Appl. No.: 519,571

[52] U.S. Cl. .................... 74/474; 74/481; 180/77 R
[51] Int. Cl.² .................... G05G 11/00; B60K 23/00
[58] Field of Search .......... 180/77 R, 66 R; 74/471, 74/474, 481

[56] References Cited
UNITED STATES PATENTS

| | | | |
|---|---|---|---|
| 3,316,773 | 5/1967 | Findlay | 74/481 |
| 3,354,981 | 11/1967 | Swanson et al. | 180/77 R |
| 3,505,896 | 4/1970 | Phillips | 180/77 R |
| 3,525,266 | 8/1970 | Brooks et al. | 74/474 X |
| 3,537,328 | 11/1970 | Allen | 74/474 X |

Primary Examiner—Kenneth H. Betts
Attorney, Agent, or Firm—Charles L. Schwab

[57] ABSTRACT

A hydrostatic transmission for a tractor is adjusted from neutral to forward and reverse drive conditions by a hand lever which is releasably held in positions of adjustment by releasable detent means. The hand lever is connected to the control arm of a variable displacement pump of the hydrostatic transmission by a spring loaded assembly having a pair relatively extensible and contractible members with a lost motion connection therebetween and a spring biasing the members to their relatively extended positions. An inching pedal is connected to the control arm of the variable displacement pump of the hydrostatic transmission through a lever and a pair of extensible and contractible links which are operable to move the control arm toward and into its neutral position whenever the foot pedal is operated. The hand lever is returned from reverse to neutral when the inching pedal is operated; however, the hand lever remains in forward when the inching pedal is operated and when the operator removes his foot from the inching pedal the tractor will resume its forward travel.

6 Claims, 14 Drawing Figures

Fig. 4-4

HAND CONTROL IN FORWARD POSITION AND HYDROSTATIC CONTROL ACTUATED FORWARD

FOOT AND HAND CONTROL FOR HYDROSTATIC TRANSMISSION

BACKGROUND OF THE INVENTION

Heretofore, others have provided various controls for tractor hydrostatic transmissions including interrelated brake and hydrostatic transmission controls. One such device is shown in U.S. Pat. No. 3,354,981. In the beforementioned prior art patent, there is illustrated a hand control for adjusting the hydrostatic transmissin from neutral to forward and reverse conditions and a brake pedal which is interconnected with the hydrostatic transmission control so as to shift the hydrostatic transmission and its hand control to neutral whenever the brake is applied. Accordingly, when the operator desires to proceed either forward or reverse after braking, he must again shift the hand control lever to the desired forward or reverse position.

BRIEF DESCRIPTION OF THE INVENTION

The control arm of the variable displacement pump of the hydrostatic transmission is connected to the forward/reverse hand operated control lever by a spring loaded lost motion link assembly and a foot operated inching pedal is connected to the pump control arm by a linkage which includes a centrally pivoted lever and a pair of lost motion links interconnecting opposite ends of the lever with the control arm. The linkage is operable to move the pump control arm from either of its forward or reverse positions to its neutral position whenever the inching pedal is operated. The forward/reverse hand control is releasably detented in its neutral and various forward and reverse positions. When the hand control is in its forward position and the inching pedal is depressed, the spring loaded lost motion link assembly will be compressed as the inching pedal moves the control arm toward neutral and the hand control will remain in the forward position. Upon release of the pedal, the pump control arm will automatically move to its forward position and the vehicle will move forwardly without the operator needing to make any hand control adjustment. However, when the hand control is in its reverse position and the inching pedal is operated, the pump control arm will be moved to the neutral position and the spring loaded lost motion link assembly will force the hand control from reverse to neutral.

BRIEF DESCRIPTION OF THE DRAWINGS

The invention is illustrated in a hydrostatically driven tractor by drawings in which.

DETAILED DESCRIPTION OF THE DRAWINGS

Figure 1:
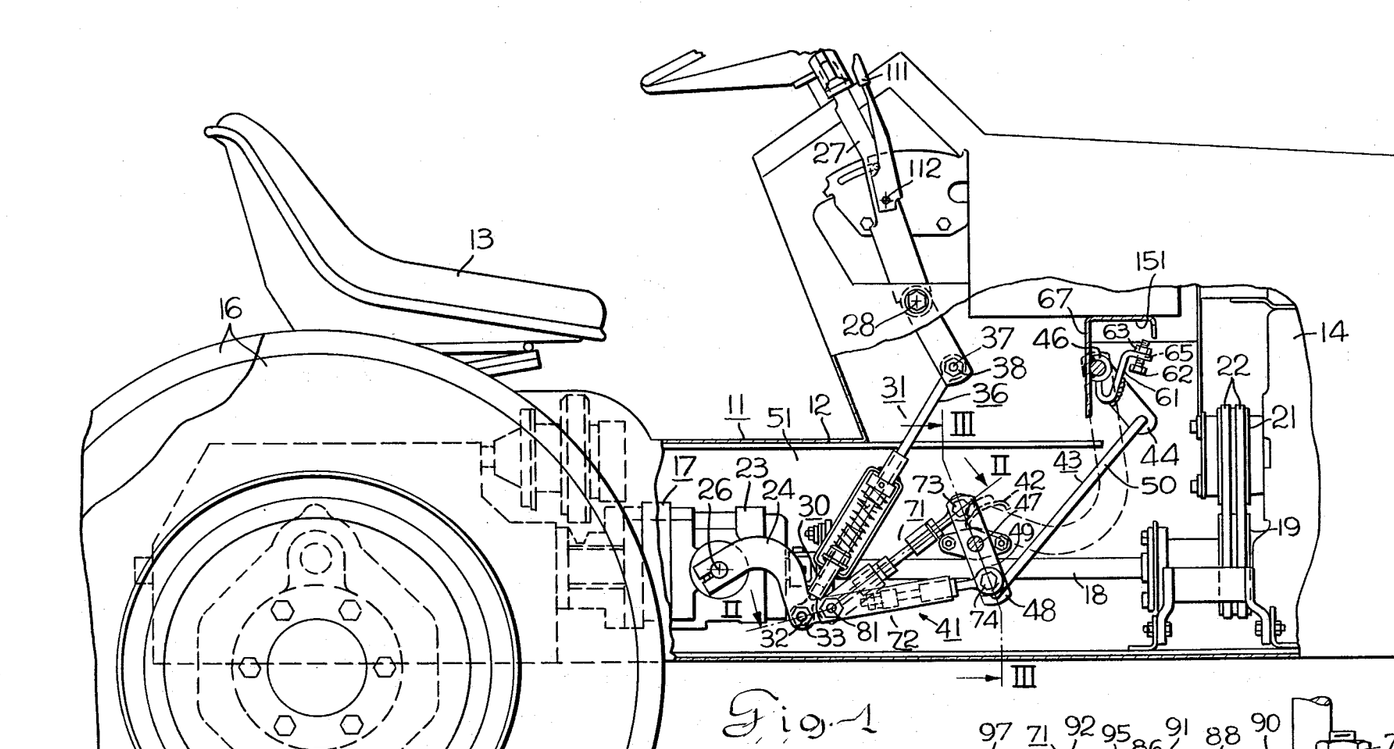
FIG. 1 is a side view of a tractor with parts removed for illustration purposes.

Referring to FIG. 1, the present invention is incorporated in a lawn and garden tractor 11 having a main frame 12 supporting an operator's seat 13 at the rear end thereof and an internal combustion engine 14 at the forward end thereof. A pair of drive wheels 16 support the rear end of the tractor frame 12 and are connected to the engine 14 by way of a hydrostatic transmission 17 and a drive train including a shaft 18 with a pulley 19 connected to a pulley 21 on the engine output shaft by a pair of V-belts 22. The hydrostatic transmission 17 includes a reversible variable displacement pump 23 of the swash plate type with a control arm 24 pivotable about a transverse axis 26 for controlling the swash plate angle between forward and reverse positions of adjustment. As shown in FIG. 1, the control arm 24 is in its neutral position as is the forward/reverse hand control lever 27 which is pivotally connected to the tractor main frame 12 on a transverse axis 28. A spring loaded extensible and contractible linkage 31 interconnects the lever 27 and the control arm 24 and includes a spring loaded list motion assembly having its lower part 30 pivotally connecting the control arm 24 by a bolt 32 and nut 33 and its upper part 36 pivotally connected to the lower end of the control lever 27 by a bolt 37 and a nut 38.

Figure 2:
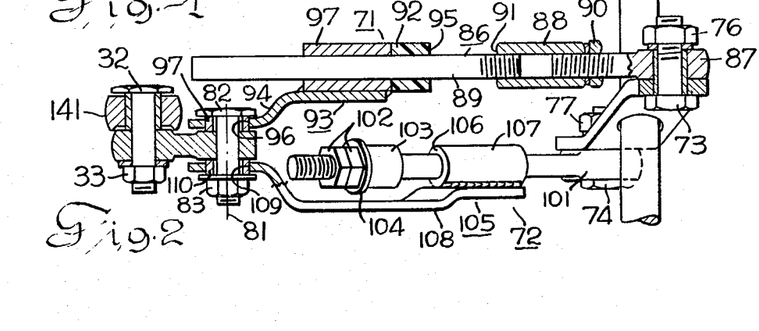
FIG. 2 is a section view taken along the line II—II in FIG. 1.
Figure 3:
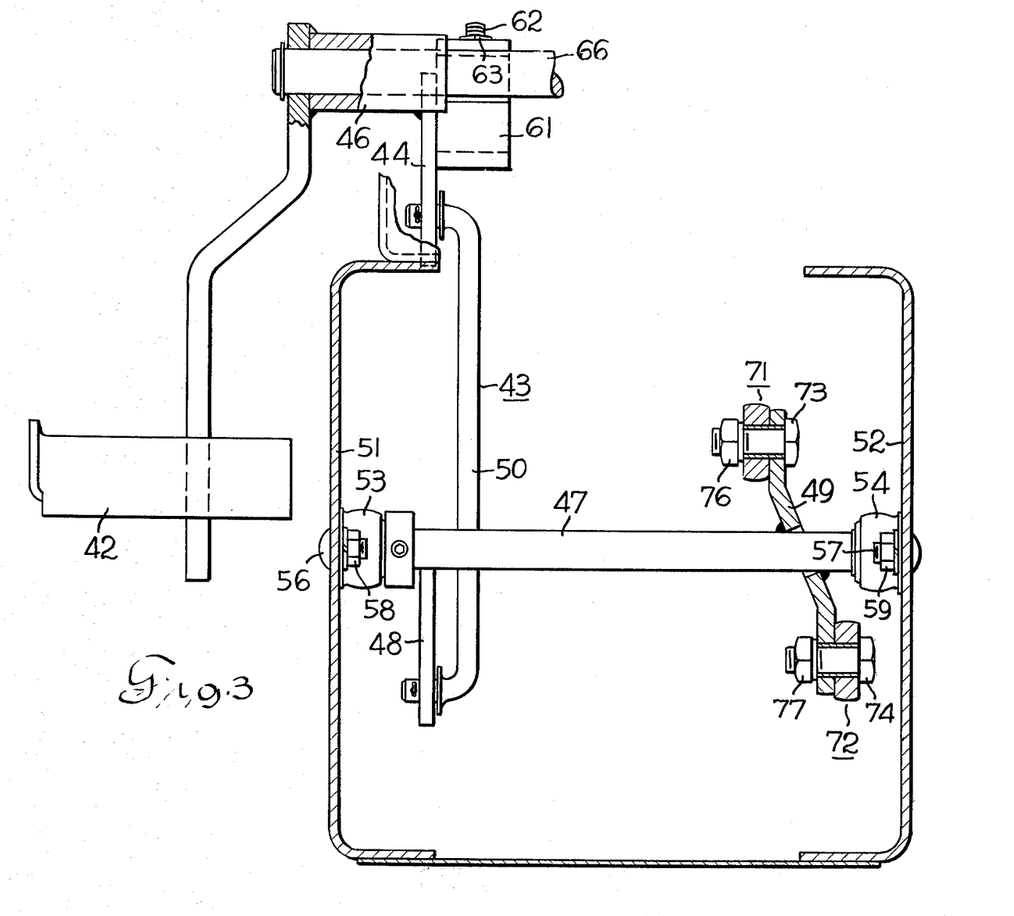
FIG. 3 is a section view taken along the line III—III in FIG. 1.

Referring also to FIGS. 2 and 3, an inching control mechanism 41 is provided on the tractor to return the hydrostatic transmission to neutral from either forward or reverse positions of adjustment whenever the foot operated inching pedal 42 is depressed. The inching pedal 42 is connected to the pump displacement control arm 24 by way of a linkage 43 which includes an arm 44 welded to a sleeve 46 to which the pedal 42 is also welded. The sleeve 46 is pivotally supported on a transverse stationary shaft 66 which is welded to a vertical wall 67 of the frame 12. The linkage 43 also includes a pivot structure in the form of a transverse shaft 47 having an arm 48 and a lever 49 which is welded to the shaft 47 at its central portion. A rod 50 with right angle ends is pivotally connected to the free ends of arms 44 and 48. The shaft 47 is pivotally mounted on the side walls 51, 52 of the tractor frame 12 by a pair of bearings 53, 54 whose housings are bolted to the side walls 51, 52 by bolts 56, 57 and nuts 58, 59. Adjustable stop means are provided on the arm 44 in the form of a bracket 61 having a threaded opening 65 threadedly engaged by a cap screw 62 which is secured in its threaded position of adjustment on bracket 61 by lock nut 63. The outer ends of centrally pivoted lever 49 are pivotally connected to a pair of lost motion links 71, 72 by bolts 73, 74 and nuts 76, 77. The rear ends of the lost motion links 71, 72 are pivotally connected to the control arm 24 of the variable displacement pump 23 of the hydrostatic transmission 17 on a common transverse pivot axis 81 by a bolt 82 and nut 83.

As shown in FIG. 2, the upper lost motion link 71 includes an adjustable rod assembly or part 86 which includes an eye bolt 87 having its eye portion pivotally connected to the bolt 73 and its threaded portion threadedly engaging the forward end of an elongated adjusting nut 88. The part 86 includes a rod 89 having a threaded end in threaded engagement with the rearward portion of the elongated adjusting nut 88. The adjusting nut 88 is locked in place on the eye bolt 87 by a lock nut 90. A resilient synthetic bushing 92 is slidably mounted on the rod 89 and has an end surface 95 in confronting abuttable relation to the end surface 91 of nut 88. The lost motion link 71 includes a rear part 93 which includes a bent element 94 presenting an opening 96 for receiving a small bushing 97 through which bolt 82 extends. The part 93 also includes a sleeve 97 welded to strap element 94 through which the rod 89 extends with a loose fit. The lower lost motion link 72 includes an eye bolt part 101 having a pair of jam nuts 102 threadedly engaging its threaded end and on which a resilient synthetic bushing 103 is disposed between a washer 104 and an end surface 106 of a sleeve 107 through which the rod 101 extends. The sleeve 107 is welded to a bent element 108 which has an opening 109 at its rear end through which a small bushing 110 extends. The bolt 82 extends through the bushing 110. The bent element 108 and sleeve 107 form a rear part 105 of the link 72. The lost motion link 71 has a pair of abutments in the form of nut 88 and bushing 92 which engage to limit contraction of the relatively extensible and contractible parts 86, 93 and the bushing 103 and sleeve 107 serve as confronting engageable abutments to limit exentsion of relatively extensible and contractible parts 101 and 105 of link 72. The nuts 102 and washer 104 on eye bolt 101 not only permit assembly and disassembly of link 72 but also permit adjustment of the extended length of link 72.

Figures 4, 5, 6, 10:
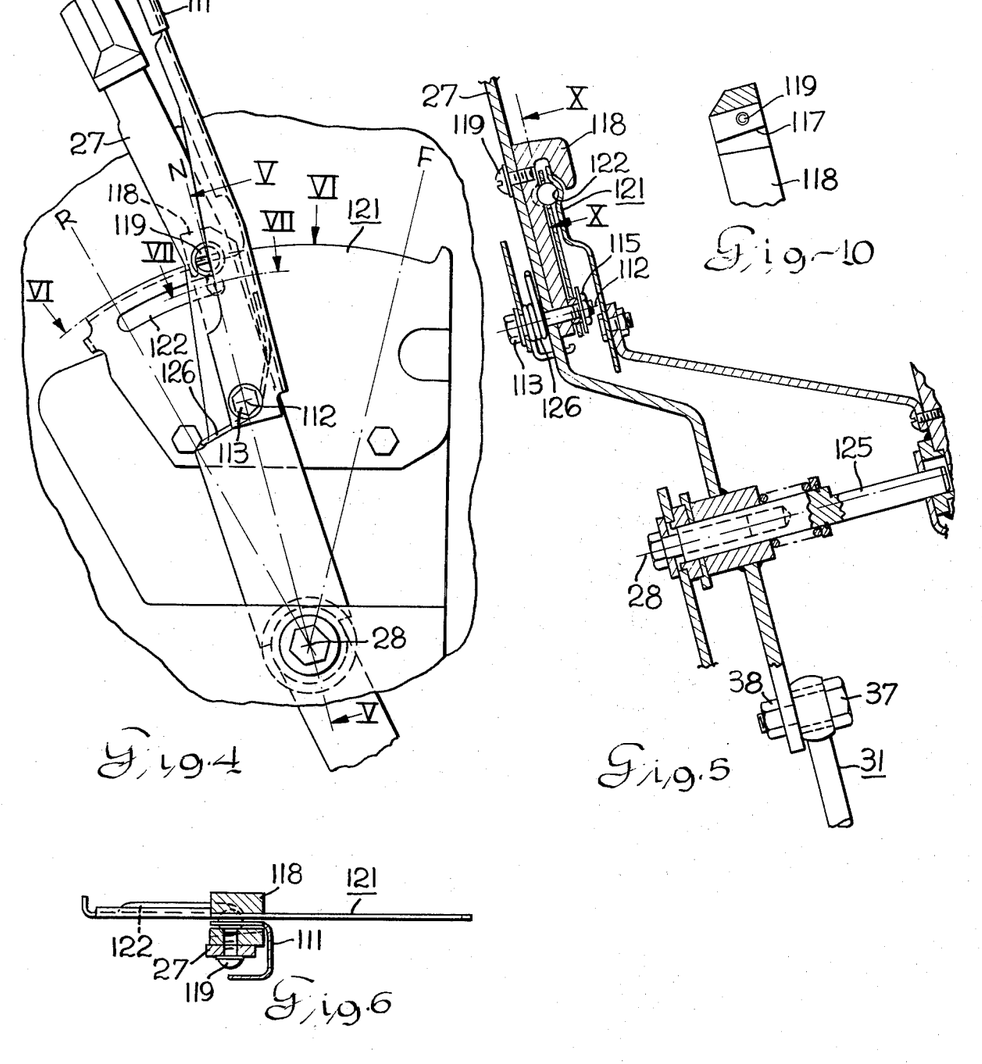
FIG. 4 is an enlarged view of the forward/reverse hand control for the hydrostatic transmission.
FIG. 5 is a section view taken along the line V—V in FIG. 4.
FIG. 6 is a section view taken along the line VI—VI in FIG. 4.
FIG. 10 is a section view taken along the line X—X in FIG. 5.
Figures 7, 8:
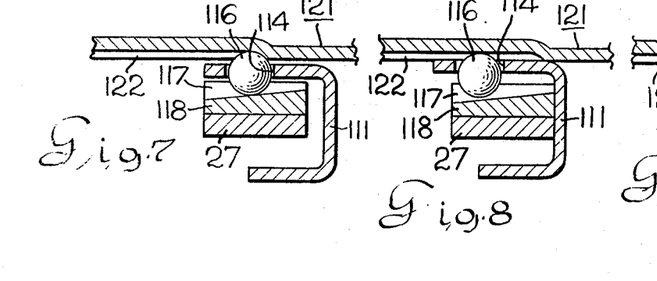
FIG. 7 is a section view taken along the line VII—VII in FIG. 4.
FIG. 8 shows the parts of FIG. 7 as the hand control is being adjusted to a reverse position.
Figure 9:
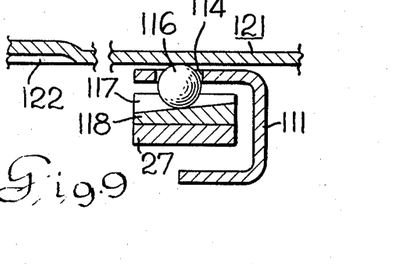
FIG. 9 is a view similar to FIG. 7 with the hand control in a forward position of adjustment.

The manually operated forward/reverse hand control shown in FIGS. 1, and 4 through 10 may be adjusted from its neutral position marked "N" in which illustrated by the operator moving the releasable detent control lever 111 rearwardly toward lever 27 about the transverse pivot axis 112 on which bolt 113 pivotally secures lever 111 thereto and then shifting the control lever either rearwardly to the reverse position marked R in FIG. 4 or forwardly to the forward position marked F in FIG. 4. Pivotal movement of the hand lever 27 on pivot shaft 125 to positions intermediate neutral and the F and R positions will achieve lower speed forward and reverse drives, respectively. As shown in FIGS. 6 through 9, the detent control lever 111 is U-shaped in cross section and includes a transverse bore 114 in which a ball 116 is disposed. The ball 116 rides in a tapered ramp formed by the bottom of a groove 117 machined in a part 118 securely fastened to the lever 27 by a cap screw 119 and the bolt 113 together with a nut 115. Referring also to FIG. 10, the groove 117 tapers from front to rear from shallow to deep depth, thus forming the incline of the ramp. The ball 116 is in abutting relation to a forward/reverse quadrant 121 which includes an arcuate recess 122 in which the ball 116 travels as the control lever 27 is moved to its reverse position. As shown in FIG. 7, the lever 27 is in its neutral position with the bottom surface of groove 117 camming the ball 116 into friction engagement with the bottom of the groove 122 of the quadrant 121 and thus, the control lever 27 is releasably held in a neutral position. A spring 126 resiliently biases the detent lever 111 clockwise as viewed in FIG. 4; and thus, as viewed in FIG. 7, the detent leve 111 is being urged by the spring 126 to the right in relation to the control lever 27. Upon movement of the detent lever 111 toward the control lever 27, such as is shown in FIG. 8, detent ball 116 will be released sufficiently to permit the control lever 27 to be moved in either direction. As shown in FIG. 8, the control lever has been moved to a reverse position of adjustment with the detent lever 111 in abutment with control lever 27. When the detent lever 111 is moved toward control lever 27, as shown in FIG. 8, it is possible to move the control lever 27 forwardly to a forward position and upon release of the detent lever 111, the lever 27 will be releasably held by contact of the detent ball 116 against the side wall of the quadrant 121 in the forward position, such as shown in FIG. 9.

Figure 11:
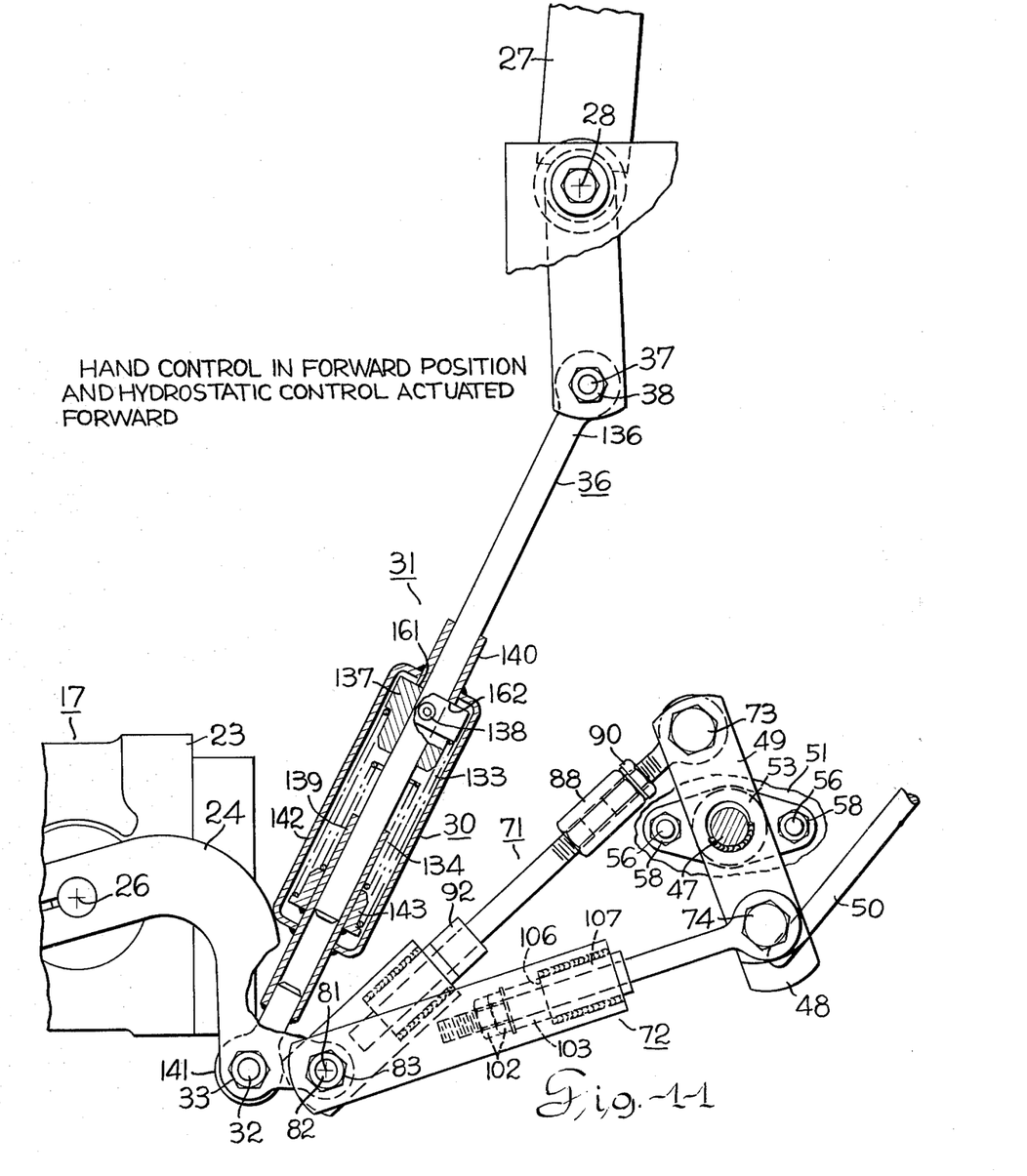
FIG. 11 is an enlarged view of part of the hydrostatic control in its forward operating condition.

Referring to FIG. 11, the resiliently biased lost motion linkage 31 includes a spring loaded assembly having a pair of relatively extensible and contractible members 30, 36 which are biased by a main coil spring 133 to their relatively extended positions as illustrated in FIGS. 1, 11, 13 and 14. An inner coil spring 134 is also provided to resist relative contraction of the members 30, 36. Member 36 includes an eye rod 136 pivotally connected to lever 27 by the bolt 37 and nut 38 and a bushing 137 which is secured by a set screw 138 to the rod 136. In this condition, abutments in the form of axially confronting end surfaces 161, 162 on bushing 137 and sleeve 140 are in axial thrust transmitting engagement. The rod end of the eye rod 136 extends downwardly into sleeves 139, 140 of member 30 which are welded to a cylindrical housing 142. A bushing 143 is disposed within the housing 142 and is welded to the sleeve 139 which in turn is welded to eye rod 141. The cylindrical housing 142 surrounds and protects the sliding members and the springs 133, 134. As shown in FIG. 11, the forward/reverse hand control 27 has been moved clockwise about axis 28 to its forward position which in turn causes the pump displacement control arm 24 to be moved to its full stroke forward position. This pivotal adjustment of the control arm 24 does not contract the link 31 because the spring 133 is sufficiently strong to force movement of the control arm 24 as the link 31 is forced downwardly by the clockwise movement of the control lever 27. When the control arm 24 is moved clockwise from its neutral position to its forward position, both of the relatively extensible and contractible links 71 and 72 of the inching control will be extended. It will be seen that link 72 has been extended to the limit permitted by engagement of the end of the resilient synthetic bushing 103 and the confronting end surface 106 of bushing 107.

Figure 12:
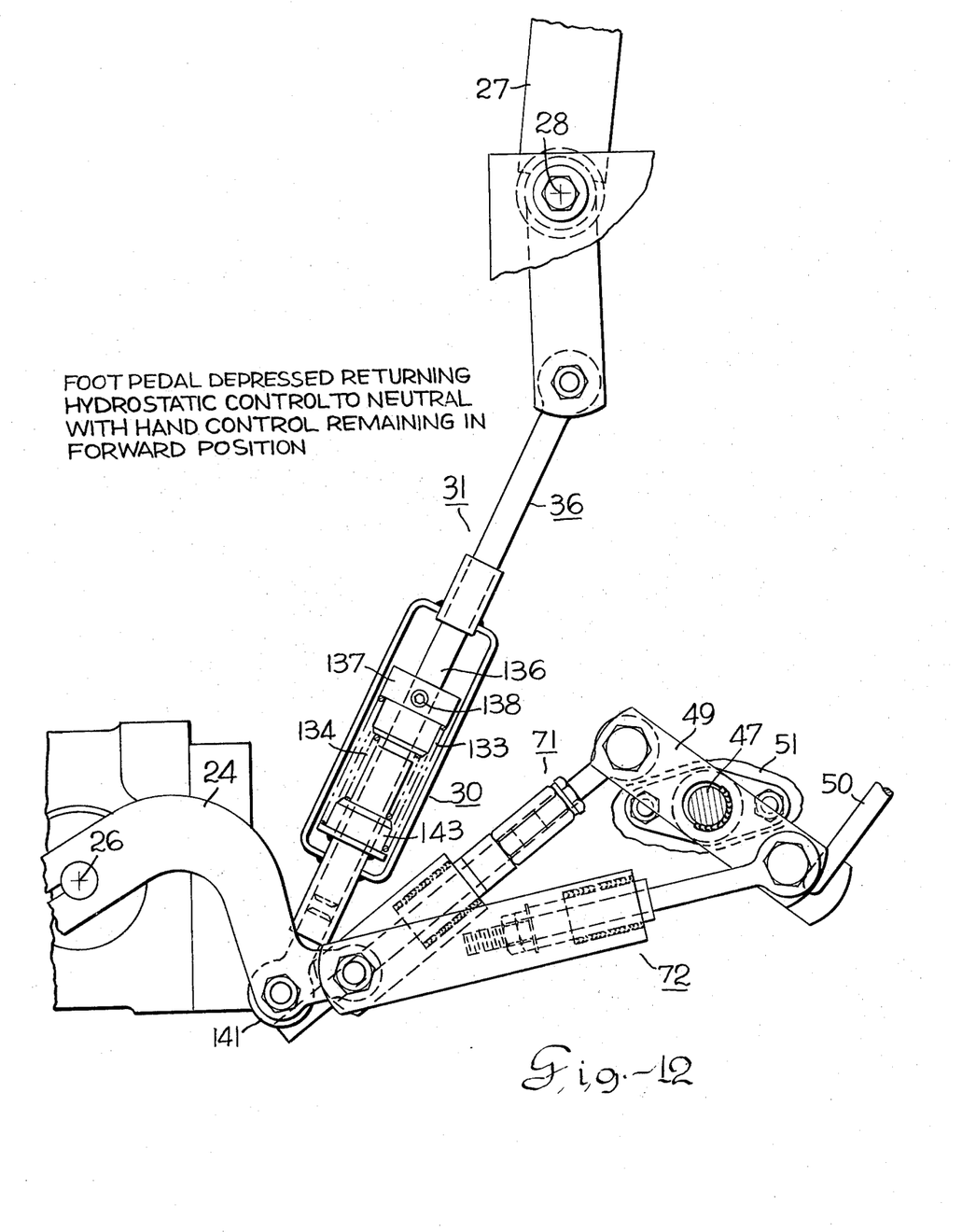
FIG. 12 is a view similar to FIG. 11 except showing the condition of the hydrostatic control when the inching pedal is operated.
Figure 13:
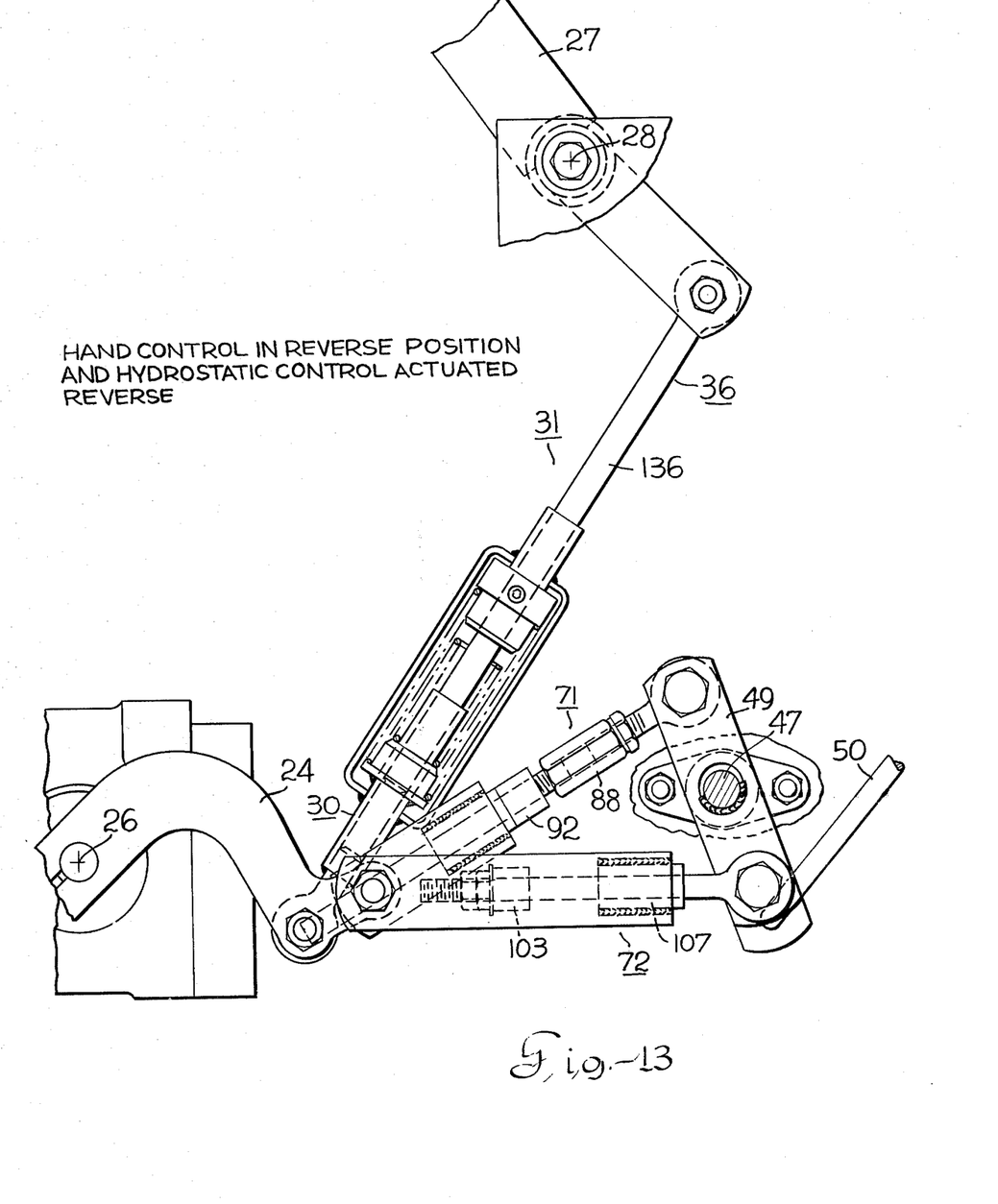
FIG. 13 shows the hydrostatic transmission control in its reverse position.

If, while traveling in the forward direction, the operator wishes to stop or slow forward travel of the tractor momentarily while turning or operating attachment controls with his hands, he may do so by partially or completely depressing the inching pedal 42. Upon full movement of the pedal 42 to the limit permitted by the adjustable stop in the form of cap screw 62 abutting against transverse wall 151, the lever 49 will be moved to the position shown in FIG. 12 and such movement will force the pump control arm 24 back to neutral position neutralposition by virtue of pulling movement of the link 72, which was already in its limit of extension when the transmission control was placed in its forward condition of adjustment. Inasmuch as the manual control lever 27 was in a forward position of adjustment wherein it was releasably locked or detented, the counterclockwise movement of arm 24 will cause a contraction of the spring biased lost motion link 31 as illustrated in FIG. 12 wherein the bushing 137 secured to rod 136 has moved downwardly compressing springs 133, 134. When the operator subsequently releases the foot operated inching pedal, 42, the tractor will proceed to move forwardly again because the springs 133, 134 will force the control arm 24 downwardly to its preset forward position as the lever 49 rotates clockwise.

Figure 14:
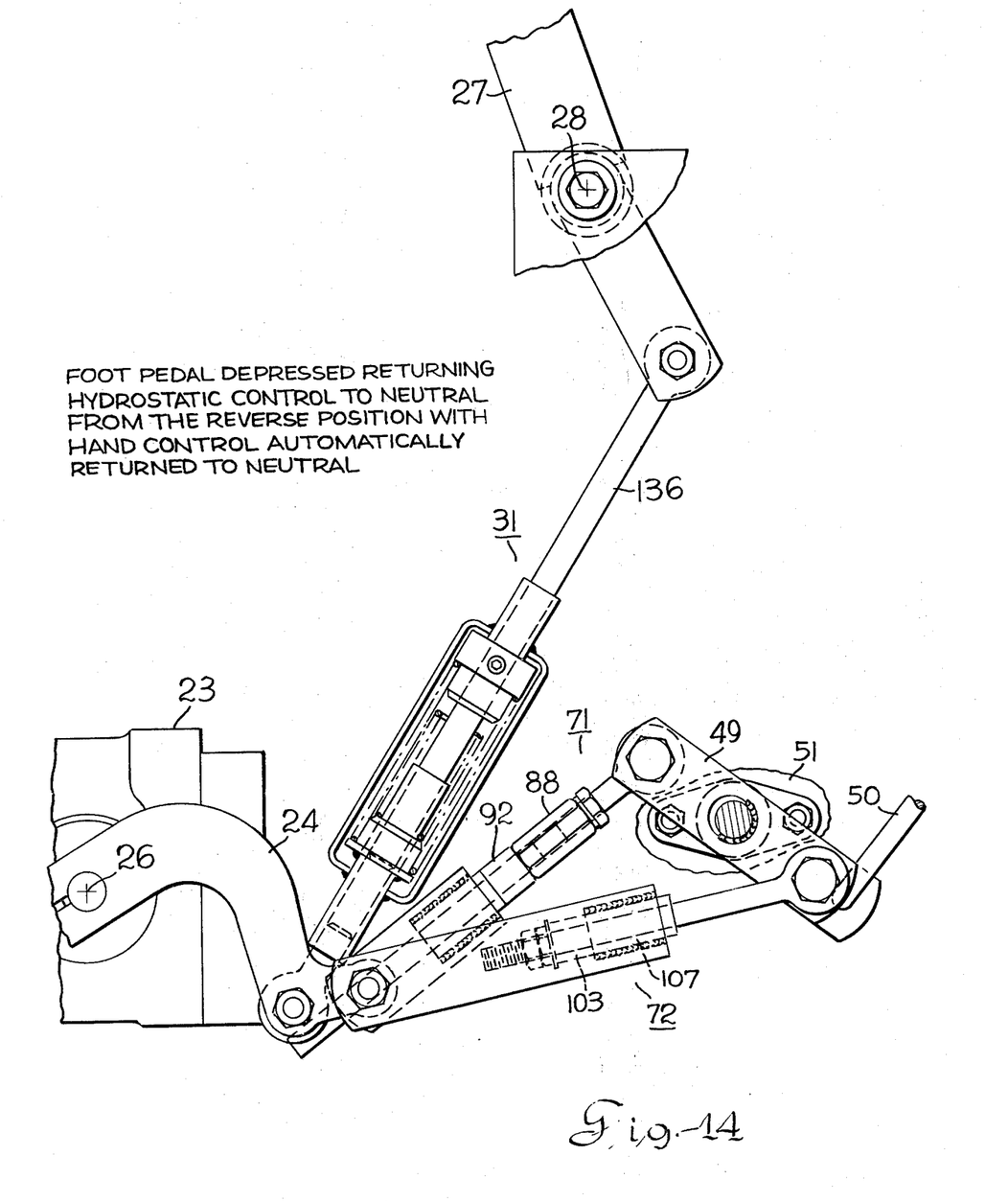
FIG. 14 shows the inching pedal depressed to return hydrostatic control from reverse to neutral.

When it is desired to shift the tractor to reverse, the detent lever 111 is pulled rearwardly toward the control lever 27 and then the two levers are moved rearwardly together to adjust the pump to a reverse drive condition through counterclockwise movement of control arm 24. The rearward movement of the control lever 27 will cause the spring loaded linkage 31 to pull the swash plate control arm 24 upwardly to the position shown in FIG. 13. In this condition, the extensible and contractible links 71 and 72 of the inching control have been contracted. If the operator wishes to temporarily slow or stop the rearward travel of the tractor, he may do so by partially or fully depressing the inching control pedal 42. Full depression of pedal 42 will move the hydrostatic transmission pump control arm downward to its neutral position as shown in FIG. 14 by virtue of the thrust transmitting engagement of nut 88 and resilient bushing 92. Since the link 31 is fully extended in the reverse position of control lever 27, it is pulled downwardly as the inching pedal is operated and the lever 27 is returned to its neutral position. Thus, when the inching control is operated during reverse travel, the forward/reverse control will be returned to neutral and if the operator wishes to resume rearward travel he must again move the control lever 27 to a reverse setting.

It should be understood that the tractor includes a separate brake pedal, not shown, for achieving vehicle braking and an engine throttle control, not shown, to control engine speed. The control lever 27 is operable to select the desired forward or reverse transmission speed ratio and to place the transmission in neutral. The inching pedal 42 not only serves to selectively change the transmission speed ratio to slow travel but also acts as a clutch when fully operated or depressed by adjusting the transmission to neutral. The inching pedal 42 is not connected to the vehicle brakes.

When the tractor is operated with a front end loader, or the like, the operator may need his hands for steering and loader control. The present control arrangement permits the operator to inch the loader forwardly into a load in a stop and go fashion without any need to use his hand to operate the control lever 27, because the control lever 27 remains in place on the quadrant 121 and the spring loaded linkage 31 returns the transmission to its previously set forward speed condition upon release of the inching pedal 42.

Inasmuch as reverse is a somewhat unnatural direction of travel, I prefer to return the forward/reverse transmission control lever 27 to neutral when the inching pedal 42 is operated during reverse travel. It can be anticipated that some operators may use the inching pedal 42 for panic stopping while traveling in reverse and for such an operation, I prefer to have the hand control lever 27 returned to neutral so that the tractor does not move when the operator subsequently releases the inching pedal 42.

The resilient bushings 92, 103 in the inching control serve to dampen the effect of sudden inching pedal depression thereby providing somewhat smoother inching operation and reducing pressure peaks in the pump 23. The set screw 138 permits adjustment of linkage 31 so that the neutral position of the control lever 27 will correspond with the neutral position of control arm 24. The nuts 88, 90 of link 71 and the nuts 102 of link 72 permit the links to be adjusted to the proper length to cause the control arm to be returned to its neutral position when the inching pedal is fully depressed as determined by the adjustable stop in the form of cap screw 62.

The embodiments of the invention in which an exclusive property or privilege is claimed are defined as follows:

1. In a vehicle having a hydrostatic forward/reverse transmission including a reversible variable displacement pump with a displacement control arm pivotable in opposite directions from a neutral position to forward and reverse positions, a control mechanism comprising:
    a manually operated forward/reverse control on said vehicle including
        a hand lever shiftable in opposite directions from a neutral position to forward and reverse positions,
        detent means releasably retaining said hand lever in its positions of adjustment and
        a linkage interconnecting said hand lever and said control arm whereby when said hand lever is in its neutral, forward and reverse positions said control arm will be in its neutral, forward and reverse positions, respectively, and
    an inching control including
        a foot pedal mounted on said vehicle movable by an operator's foot from a released position to an operated position,
        a pivot structure pivotally mounted on said vehicle on an axis parallel to the pivot axis of said control arm,
        first and second lost motion links pivotably interconnecting said control arm and said pivot structure at points on the latter at opposite sides of its pivot axis, said first lost motion link having relatively extensible and contractible parts and confronting abutments limiting contraction thereof and said second lost motion link having relatively extensible and contractible parts and confronting abutments limiting extension thereof, and
        motion transmitting means interconnecting said pedal and pivot structure whereby movement of said pedal to its operated position pivots said pivot structure in one direction thereby causing at least one of said lost motion links to force said control arm to its neutral position.

2. The control mechanism of claim 1 wherein at least one of said abutments of each of said lost motion links is resilient.

3. The control mechanism of claim 1 wherein said linkage interconnecting said hand lever and control arm includes a spring loaded assembly having a pair of relatively extensible and contractible members with cooperable abutments limiting extension of said assembly and a spring operatively interposed between said members biasing the latter to their relatively extended positions.

4. The control mechanism of claim 3 wherein said detent means permits said hand lever to be automatically moved from its reverse to its neutral position when said foot pedal is operated with the control arm in its reverse position.

5. The control mechanism of claim 4 wherein said detent means maintains said hand lever in its forward position and said assembly is contracted when said foot pedal is operated with said control arm in its forward position and wherein said assembly will extend upon subsequent release of said foot pedal thereby returning said control arm to the forward position it previously occupied.

6. The control mechanism of claim 5 wherein at least one of said abutments of each of said lost motion links is resilient.

* * * * *